United States Patent
Griffin et al.

(10) Patent No.: US 9,217,822 B2
(45) Date of Patent: Dec. 22, 2015

(54) ENCAPSULATED LED ARRAY AND EDGE LIGHT GUIDE DEVICE COMPRISING SUCH AN LED ARRAY

(75) Inventors: Neil Griffin, Cambridge (GB); Neil Pollock, Royston (GB)

(73) Assignee: ITI SCOTLAND LIMITED, Glasgow (GB)

(*) Notice: Subject to any disclaimer, the term of this patent is extended or adjusted under 35 U.S.C. 154(b) by 542 days.

(21) Appl. No.: 13/637,135

(22) PCT Filed: Mar. 25, 2011

(86) PCT No.: PCT/GB2011/050609
§ 371 (c)(1),
(2), (4) Date: Dec. 4, 2012

(87) PCT Pub. No.: WO2011/117649
PCT Pub. Date: Sep. 29, 2011

(65) Prior Publication Data
US 2013/0070480 A1 Mar. 21, 2013

(51) Int. Cl.
*F21V 8/00* (2006.01)
*H01L 33/56* (2010.01)

(52) U.S. Cl.
CPC ............ *G02B 6/0028* (2013.01); *G02B 6/0031* (2013.01); *G02B 6/0068* (2013.01); *G02B 6/0073* (2013.01); *G02B 6/0083* (2013.01)

(58) Field of Classification Search
CPC ... G02B 6/0028; G02B 6/0073; G02B 6/0083
USPC .................................................. 362/612, 97.3
See application file for complete search history.

(56) References Cited

U.S. PATENT DOCUMENTS

| | | |
|---|---|---|
| 7,991,257 B1 | 8/2011 | Coleman |
| 2005/0053330 A1 | 3/2005 | Arakida et al. |
| 2006/0187528 A1 | 8/2006 | Hagood et al. |
| 2006/0187552 A1 | 8/2006 | Huang et al. |
| 2006/0262554 A1 | 11/2006 | Mok et al. |
| 2006/0268551 A1 | 11/2006 | Mok et al. |
| 2007/0002205 A1 | 1/2007 | Hasei |
| 2007/0115687 A1 | 5/2007 | Verweg et al. |
| 2007/0121340 A1 | 5/2007 | Hoshi |
| 2007/0274096 A1 | 11/2007 | Chew et al. |

(Continued)

FOREIGN PATENT DOCUMENTS

| | | |
|---|---|---|
| CN | 1570724 A | 1/2005 |
| CN | 1975532 A | 6/2007 |

(Continued)

OTHER PUBLICATIONS

International Search Report and Written Opinion dated Jun. 8, 2011 for PCT/GB2011/050609.

(Continued)

*Primary Examiner* — David V Bruce
(74) *Attorney, Agent, or Firm* — Pepper Hamilton LLP

(57) ABSTRACT

This invention relates to structures for mounting LEDs, the structures being suitable for use in the manufacture of light guide devices. This invention also relates to light guide devices comprising the structures and methods of manufacture of the aforementioned. The light guide devices are suitable for use in a range of applications, particularly in connection with the backlighting of displays, for example, liquid crystal displays.

20 Claims, 13 Drawing Sheets

(56) References Cited

U.S. PATENT DOCUMENTS

| | | |
|---|---|---|
| 2008/0123192 A1 | 5/2008 | Lin |
| 2008/0123367 A1 | 5/2008 | Pan |
| 2009/0001397 A1 | 1/2009 | Fine et al. |
| 2009/0162015 A1 | 6/2009 | Meir et al. |
| 2009/0196070 A1 | 8/2009 | Kim |
| 2009/0296017 A1 | 12/2009 | Itoh et al. |
| 2009/0297090 A1* | 12/2009 | Bogner et al. ............... 385/14 |
| 2010/0073948 A1 | 3/2010 | Stein et al. |
| 2012/0268963 A1 | 10/2012 | Gourlay et al. |
| 2013/0077027 A1 | 3/2013 | Griffin et al. |
| 2013/0125301 A1 | 5/2013 | Natt et al. |

FOREIGN PATENT DOCUMENTS

| | | |
|---|---|---|
| CN | 101118292 A | 2/2008 |
| EP | 0597261 A1 | 5/1994 |
| EP | 1111738 A1 | 6/2001 |
| EP | 1434277 A1 | 6/2004 |
| EP | 1746666 A2 | 2/2007 |
| EP | 1791010 A2 | 5/2007 |
| EP | 2157366 A1 | 2/2010 |
| GB | 2438440 A | 11/2007 |
| GB | 2454928 A | 5/2009 |
| GB | 2463913 A | 3/2010 |
| JP | 5-315654 A | 11/1993 |
| JP | 2008-305657 A | 12/2008 |
| TW | 200909942 A | 3/2009 |
| TW | 200931084 A | 7/2009 |
| WO | WO 2006/033029 A1 | 3/2006 |
| WO | WO 2006/089450 A2 | 8/2006 |
| WO | WO 2007/138294 A1 | 12/2007 |
| WO | WO 2008/035256 A2 | 3/2008 |
| WO | WO 2008/062812 A1 | 5/2008 |
| WO | WO 2008/139353 A1 | 11/2008 |
| WO | WO 2008/141316 A1 | 11/2008 |
| WO | WO 2009/038069 A1 | 3/2009 |
| WO | WO 2009/066056 A1 | 5/2009 |
| WO | WO 2009/093583 A1 | 7/2009 |
| WO | WO 2009/139759 A2 | 11/2009 |
| WO | WO 2011/045589 A1 | 4/2011 |
| WO | WO 2011/117647 A2 | 9/2011 |
| WO | WO 2011/117649 A1 | 9/2011 |

OTHER PUBLICATIONS

GB Search Report dated Jul. 22, 2010 for GB 1005112.6.
GB Search Report dated Feb. 23, 2010 for GB0917785.8.
GB Search Report dated Jul. 23, 2010 for GB 1005109.2.
International Search Report and Written Opinion dated Jan. 25, 2011 for PCT/GB2010/051708.
International Search Report and Written Opinion dated Dec. 23, 2011 for PCT/GB2011/050605.

* cited by examiner

ENCAPSULATED LED ARRAY AND EDGE LIGHT GUIDE DEVICE COMPRISING SUCH AN LED ARRAY

FIELD OF THE INVENTION

This invention relates to LED assemblies, said assemblies being suitable for use in the manufacture of light guide devices. This invention also relates to light guide devices comprising said assemblies and methods of manufacture of the aforementioned. The light guide devices are suitable for use in a range of applications, particularly in connection with the backlighting of displays, for example, liquid crystal displays.

BACKGROUND OF THE INVENTION

A number of light guiding devices are known. These devices are employed for a range of functions including illumination, backlighting, signage and display purposes. Typically, the devices are constructed from a moulded or cast transparent plastic component, where a light source, such as a fluorescent lamp or a plurality of light emitting diodes (LEDs), is integrated by means of mechanical attachment at the edge of the transparent plastic component.

Common to all of these devices is the fact that light from the light source is guided through a transparent guide, typically made of plastic, by total internal reflection. For backlighting applications, light is emitted in a substantially perpendicular direction to that of the direction of propagation of the light within the transparent guide. This may be achieved through the light being directed so as to interact with scattering structures located within, or on the surface of, the transparent guide.

The integration of fluorescent lamps or LEDs to the edge of the transparent light guide is not a straightforward process and thus significantly increases the complexity of the production process for these devices. Achieving a good coupling of the light source and the light guide is essential to the optical performance of the device. In addition, edge coupling of the light sources may render these components susceptible to mechanical damage during both the production process and the normal use of the device.

Many backlights fall into the categories of "edge-lit" or "direct-lit". These categories differ in the placement of the light sources relative to the output of the backlight, where the output area defines the viewable area of the display device. In edge-lit backlights, one or more light sources are disposed along an outer border or edge of the backlight construction outside the zone corresponding to the output area. The light sources typically emit light into a light guide, which has length and width dimensions of the order of the output area and from which light is extracted to illuminate the output area. In direct-lit backlights, an array of light sources is disposed directly behind the output area, and a diffuser is placed in front of the light sources to provide a more uniform light output. Some direct-lit backlights also incorporate an edge-mounted light, and are thus illuminated with a combination of direct-lit and edge-lit illumination.

FIG. 1 illustrates a known edge-lit light guide arrangement. LEDs (1) are arranged at the edge of a transparent polymer core light guide layer (2). Light (3) from the LEDs propagates by total internal reflection through the light guide layer and is scattered through approximately 90° by scattering structures, such as point like defects, (4) and exits (3a) the light guide layer. In the figure shown, the device is viewed from above as indicated; the main light output surface is indicated at (5) and the point like defects (4) are located on the opposite lower surface. The refractive index contrast between the core and surrounding air provides the guiding effect. Light scattered out of this type of structure is emitted from the top surface over a full hemisphere of output angles.

The use of LEDs in backlight units is becoming increasingly popular. A standard LED package generally includes a hard plastic protecting material which supplies a high degree of mechanical stability to a lead frame structure. The lead frame possesses first and second terminals referred to as the die attach lead and the isolated lead by which electrical power is supplied to the LED package. The single LED may be connected to both leads by wire bonds. In operation, the LED package assembly has power applied to the lead frame at either of the first and second terminals depending on which part of the LED is the anode and which part is the cathode. The plastic protecting material allows for the manipulation and bending of the lead frame leads for solder configuration. Various polymers have been used by various manufacturers as the protecting material in connection with the packaging of LED products. However, methods for protecting the LED die are limited because of the relatively fragile nature of the wire-bonded lead frame arrangement. The hard plastic protecting material is normally applied using a resin-transfer process, a casting process which uses optical casting resins rather than injection-mouldable polymers. Resin transfer is a low pressure process that has a low risk of damaging wire bonds. Most protecting materials used for LED production have very high refractive indices resulting in a high proportion of the light generated by the LED die being reflected back in to the material at the material/air surface interface.

It is an object of the present invention to provide, inter alia, a light guiding device that addresses one or more of the aforesaid issues.

SUMMARY OF THE INVENTION

In a first aspect of the present invention, there is provided an edge-lit light guide device comprising:

an LED assembly which comprises an array of LEDs wherein the LEDs are mounted on electrical connecting structures and encapsulated in a transparent polymer wherein the transparent polymer forms a single non-imaging concentrator and said non-imaging concentrator is mounted at the edge of a light guide layer.

The electrical connecting structures, which are preferably flat or substantially flat and made from metal, may be formed from a flat metal lead frame structure, wherein the lead frame may comprise a number of thin substantially parallel flat legs which are connected at each end to a perimeter frame which serves to provide structural rigidity during the manufacturing process. Typically the legs are spaced, there may be a gap between all or substantially all of the legs. Once the LEDs have been encapsulated in the transparent polymer then the perimeter frame may be removed to leave a number of substantially parallel legs which are held in position by the encapsulating polymer. The edge of the light guide layer to which the LED assembly is mounted is perpendicular or substantially perpendicular to the main light output surface of the light guide device and the non-imaging concentrator and light guide layer are optically coupled.

According to a further aspect of the present invention, there is provided a method of making an LED assembly comprising an array of LEDs which is suitable for use in a light guide device comprising:

mounting an array of LEDs on to a lead frame, wherein the lead frame comprises a number of substantially parallel legs which are connected at each end to a perimeter frame;

injection moulding a transparent polymer to encapsulate the LEDs within said transparent polymer;

removing the perimeter frame.

The LED assembly is suitable for use in a light guide device and the transparent polymer encapsulant may be connected or optically coupled to a light guide layer which may be referred to herein as a core light guide layer. Light from the LED assembly is guided through the core light guide layer by total internal reflection.

In a further aspect, the present invention also provides an LED assembly suitable for use in a light guide device wherein said assembly comprises an array of LEDs mounted on electrical connecting structures and encapsulated in a transparent polymer wherein the transparent polymer forms a single non-imaging concentrator. The non-imaging concentrator may comprise a light input area and a light output area. The array of LEDs may be positioned to direct light into the light input area of the non-imaging concentrator. The light input area and light output area may be a light input surface and a light output surface. For example, the non-imaging concentrator may be a CPC which is injection moulded to form a solid structure thus defining light input and light output surfaces. Alternatively, the light input and output areas may be apertures.

In a further aspect, there is provided a display device comprising the light guide device according to the first aspect of the invention. The display device may be a liquid crystal display device.

DETAILED DESCRIPTION OF THE INVENTION

Light Guide Device

The light guide device may be employed for a range of functions including illumination, backlighting, signage and display purposes. Light from the light source is guided through a light guide layer, typically made of plastic, by total internal reflection. For edge-lit backlighting applications, non-guided light is emitted in a substantially perpendicular direction to that of the direction of propagation of the light within the light guide layer which is typically light transmissive or transparent. This may be achieved through the light being directed so as to interact with scattering structures, such as point defects or films located within or on the surface of the light guide layer.

The coupling of the LEDs to the light guide layer may be achieved according to a range of techniques. This may be achieved by a butt joining process where the injection over moulded polymer is attached to the end of the light guide by bonding with a transparent adhesive, which may possess a high refractive index, that acts to reduce reflections from the ends of the light guide layer. Preferably, the refractive index of the adhesive is matched to the refractive index of the light guide layer and/or the non-imaging concentrator. Alternatively, the refractive index of the adhesive is between the refractive index of the light guide layer and the non-imaging concentrator. The light guide layer may be hot cleaved, flame-treated or polished to provide a suitable optical surface at the end of the light guide layer which facilitates good coupling of light from the over-moulded LED array into the light guide layer.

Core Light Guide Layer

The core light guide layer may be made from a range of suitable light transmissive or transparent polymer materials. Preferably, the core light guide layer should possess a high optical transmission. Suitable materials for the core include transparent polymers such as polymethylmethacrylate (PMMA), polystyrene and other optical polymers. The core light guide layer is, depending on the performance required, typically in the range of about 0.5 mm to 4 mm, for example, about 1 mm or about 1.5 mm in thickness. The refractive index of the core light guide layer may be from about 1.4 to about 1.8, for example about 1.5. The terms "transparent" and "transmissive" relate to the optical properties of particular components of the device relative to the wavelength of the light generated by the incorporated light sources.

The core light guide layer may be sandwiched between the inner surfaces of a first and a second cladding layer. There may also be present: a plurality of scattering structures located at the interface between the first cladding layer and the core light guide layer and/or at the interface between the second cladding layer and the core light guide layer; and a series of microlenses arranged on an outer surface of the first cladding layer which is opposite and parallel or substantially parallel to the inner surface of said cladding layer. The refractive indices of the microlenses and the core light guide layer are typically greater than the refractive indices of the cladding layers. The scattering structures serve to deflect light guided through total internal reflection in the core light guide layer into non-guided directions. Light guided in the core light guide layer is retained within the light guide device and may include light scattered by the scattering structures but not sufficiently scattered to be emitted from the light guide device. Non-guided directions include light which is scattered by the scattering structures through approximately 90° and emitted by the light guide device. The outer surface of the first cladding layer on which the series of microlenses may be arranged is the main light output surface. In order for light to be scattered through substantially 90°, in a non-guided direction, and in the direction of the main light output surface, a plurality of scattering structures, for example point defects, may be provided on one of the inner surfaces of the first or second cladding layers and/or on one of the surfaces of the core light guide layer sandwiched between the inner surfaces of the first and second cladding layers. Alternatively, or in addition, the scattering structures may be located within the main body of the core light guide layer. Preferably, each one of the scattering structures has a microlens located directly above it.

The light guide device is arranged to receive light from the LED array and to at least partly constrain light therein by total internal reflection. In particular, the light guide device is suitable for use as an edge lit light guide device and the device may comprise LEDs along one or more edges of the device. The cladding layer between the core light guide layer and the microlenses may be referred to as an intermediate layer. The microlenses are preferably directly in contact with the intermediate layer.

If the core light guide layer has a refractive index $n_1$, the intermediate layer has index $n_2$ and the microlenses have a refractive index $n_3$, then the preferred relationship is $n_3 \geq n_1 > n_2$. Preferably the ratio of the refractive indices of $n_1$ and $n_3$ to $n_2$ should be as high as possible.

The advantages associated with the embodiments of the invention which include the intermediate layer and microlenses, include improved optical coupling efficiency into a desired range of output angles. Improved optical coupling efficiency reduces the amount of input light required and hence the cost and power consumption of the light sources. The present invention also allows for the output angle to be controlled so the viewing angle can be set accordingly.

The LED Assembly

The electrical connecting structures on which the array of LEDs is mounted may be formed from a lead frame structure. The array of LEDs may be a linear array of LEDs.

The lead frame may be a flat, metal structure and be suitable for mounting a linear array of LEDs within an injection-moulded optical component such as a non-imaging concentrator. A suitable example of a non-imaging concentrator is a compound parabolic concentrator (CPC). The LEDs may be distributed in a linear format at a low average pitch whilst protecting LED wire-bonds from damage during the encapsulating procedure. A suitable encapsulating procedure is an injection moulding process. The lead frame may be chemically etched as a discrete panel or as a continuous strip using fine-blanking processes. The edge-lit light guide device may comprise more than one LED assembly.

Advantageously, the design of the lead frame means that injection moulding technology may be used which, traditionally has not been considered suitable for use in the conventional packaging of LED dies due to the force from the flow of the molten plastic which may damage wire bonds. The use of injection moulding allows for the use of optical materials which have closely matched coefficients of thermal expansion (CTE). The polymer which is used to encapsulate the LED array can be formed in a polymer which can match or substantially match the refractive index of the core light guide layer.

The legs of the lead frame are typically wide and flat (e.g. about 0.6 mm width and about 0.2 mm thickness) and most of the length of the lead frame leg is not over-moulded. At least a portion of the legs of the lead frame is over moulded. At least the portion of the leg on which an LED is mounted will also be encapsulated by transparent polymer. Typically, the legs are spaced and have gaps between them. All of the legs, or substantially all of the legs, may be evenly spaced. The legs provide electrical connection to the LEDs which are mounted onto them within the plastic over-mould. The exposed leg lengths (i.e. those parts which are not over-moulded) can be used to conduct heat away from the LEDs. The exposed legs may have some degree of mechanical flexibility which is useful in offsetting any differential expansion between the plastic over-mould and any metal frame works which support and electrically connect to the lead frame legs.

A metal lead frame may be manufactured in a flat format, either, for example by chemical etching or by fine blanking. The metal lead frame comprises a number of thin, flat legs surrounded by a frame which provides structural rigidity and optionally mechanical location points. At least some or all of the legs may be attached at both ends of a leg to the surrounding frame. In the final application, electrical connections from the LEDs may be made to the legs. A linear array of bare LEDs may be mounted onto the legs and, where required, electrical connections are formed between the LED electrode pads and the lead frame legs using wire bonds.

The metal lead frame may be made from a material which possesses a high thermal conduction. Suitable examples include copper. The lead frame may be produced either as a chemically etched discrete panel or as a continuous fine blanking. Typically, the gap between the legs may be no wider than the thickness of the lead frame material. This gap and the lead frame thickness may be about 0.2 mm.

The lead frame may be plated with one or more suitable materials (plating materials) which will not corrode or grow whiskers when an electrical current is applied to it. An example of a suitable material is gold. The plating material provides a good bond strength to the wire-bond. Shaped recesses in the mounting surfaces of the lead frames can be added to create reflective dishes (to improve the light collection efficiency) or to compensate for LED height differences. If the lead frame is to be used as a reflector then suitable plating materials include silver platings which provide improved efficiency of reflection.

The LEDs may be resin bonded or soldered to the legs of the lead frame and may be arranged in a linear or a substantially linear array. If the LEDs have a bottom electrode then the leg the LED is mounted on may provide the power or the ground connection. If the LEDs have two top electrodes, the mounting legs are purely structural (and for thermal conduction) and legs either side of a particular LED may be required to feed and return the power to the LED. The LEDs may then be wire-bonded to the appropriate legs of the lead frame in order to create electrical connections. The wire bonds may be aligned with the linear array of LEDs. The average LED pitch may be reduced by forming a cluster of similar LEDs which are electrically connected in series (in a daisy-chain type arrangement); in this case, the wire bonds may be connected directly from one die to the next.

A conformal coating may be applied to the lead frame comprising the array of LEDs in order to prevent electrical shorting in the event some of the wire bonds might be distorted during the injection moulding process. The conformal coating may be a thin dielectric coating which is capable of surviving the temperatures generated within an injection-moulding tool. Suitable dielectric coatings include acrylic or parylene.

Suitable light sources include one or more LEDs. The light may be non-directional. In particular, the light sources are preferably suitable for use in an edge lit arrangement. The LEDs can be any of the designs known to those skilled in the art, including edge-emitting, side emitting, top emitting or bare die LEDs. The LEDs may be selected from one or more of a range of colours. For example, the LEDs may be white. White light may also be generated by combining red, green and blue LEDs. Typically, a bare-die LED suitable for use in the present invention is of the order of about 0.3 mm in each dimension.

Once the LEDs have been encapsulated in the transparent polymer then the perimeter frame may be removed to leave a number of substantially parallel legs which are held in position by the encapsulating polymer. The perimeter frame may be removed by using a suitable tool such as a hand tool (snips or shears) or a powered punch tool.

Encapsulating Polymer

The LED populated lead frame may be placed in an injection moulding tool and the encapsulant may be moulded over the array of LEDs thus forming a single non-imaging concentrator polymer structure. The injection moulded material may be an optical grade polymer such as PMMA or polycarbonate (PC). The refractive indices of the non-imaging concentrator and the core light guide layer may be the same or substantially the same. As such, the refractive index of the non-imaging concentrator may be about 1.4 to about 1.8, for example about 1.5.

The injection moulded material forms a non-imaging concentrator. The non-imaging concentrator is an optical component that efficiently transmits light from an input to an output, where the area of the output is greater than the area of the input. Such a component has the effect of reducing the angular divergence of the light at the output compared with that at the input. A suitable example of a non-imaging concentrator is a compound parabolic concentrator (CPC) which is suitable for use in connection with the present invention. The CPC may take the form of a shape extruded in the direction of the LED array, and bounded by two shifted and tilted parabolas selected in accordance with the edge ray principle, and by straight input and output surfaces. The form of the parabolic surfaces is such that, if they were perfect reflectors, then 100% of the radiation entering its input aperture or surface would fall within the angle and exit aperture, or surface, diameter dictated by the optical invariant. The CPC for use in accordance with the present invention preferably uses total internal reflection surfaces, giving 100% reflectivity. The only losses may be from material absorption, scattering defects, plus approximately 2% loss from light that does not meet the total internal reflection condition. Thus the CPC is nearly an ideal concentrator. The over moulded structure is compatible with mounting onto a thin (e.g. about 1 mm-4 mm) edge of a light guide layer without deforming as the temperature changes. The LED array may be over moulded using an injection moulding tool and optical polymer to mould a non-imaging concentrator type structure such as a CPC in intimate contact with the legs and the LEDs effectively embedding the light source within the CPC. The lead frame legs may be carefully designed to minimise the average LED pitch, provide stiffening features to reduce distortion during injection moulding and ensure adequate conduction of heat from the LEDs.

Microlenses

Microlenses are small lenses, typically possessing a diameter of about 0.5 to 5 mm. The microlens may comprise hemispheres possessing a diameter of about 2.25 mm or about 4.5 mm. The microlenses may be aspherical in shape. The microlenses may be Fresnel lenses which may have surface features typically of about 0.001 mm to 1 mm in thickness. The refractive index of the microlenses may be about 1.4 to 1.8, for example about 1.6. Suitable materials for the microlenses include polycarbonates, polystyrene or UV curing materials such as a lacquer or an epoxy. The pitch of the lenses may be about 3.1 mm.

The microlens array may be fabricated as a single sheet which may, for example, be injection moulded or formed by a reel to reel thermal embossing technique, or a UV curing reel to reel technique. The overall thickness of such a sheet may typically be about 0.01 mm to 1 mm.

Cladding Layers

The cladding layers may be made from a range of suitable light transmissive polymer materials. The cladding layers possess lower refractive indices than the core light guide layer and the microlenses. Suitable materials for the cladding layers include transparent polymers such as fluoropolymers.

The cladding layers are typically of the order of about 0.01 mm to 0.3 mm in thickness. The refractive index of the cladding layers may be from about 1.25 to about 1.4, for example about 1.35. A suitable material for the cladding layers is fluorinated ethylene propylene (FEP). Advantageously, the ratio of the thickness of the core light guide layer to the thickness of the intermediate layer is greater than about 5.

Reflector Layer

Light will be scattered in both a first (or upward) direction (towards the main light output surface) and a second (or downward) direction by the scattering structures. It is advantageous to reflect light scattered in the downward direction back in an upward direction using a reflective sheet placed substantially parallel and behind the core light guide layer or, if present, the second cladding layer. The reflective sheet may be attached to the light guide layer or second cladding layer along its main surface. Such a reflective sheet may be made from a metallised polymer film or similar, for example polyethylene terephthalate (PET) possessing a vacuum deposited aluminium layer thereon. The reflective sheet may alternatively be made from a white film or sheet.

Scattering Structures

In order for light to be scattered through substantially 90°, in a non-guided direction, and in the direction of the main light output surface, a plurality of scattering structures, for example, point defects may be provided on one of the inner surfaces of the first or second cladding layers and/or on one of the surfaces of the core light guide layer which may be sandwiched between the inner surfaces of first and second cladding layers. Alternatively, or in addition, the scattering structures may be located within the core light guide layer. Preferably, the scattering structures are positioned concentric with the microlenses. The scattering structures may be indents or raised features defined into a surface of the core light guide layer or into a surface of a cladding layer. Alternatively, a scattering material such as a pigmented white ink containing $TiO_2$ particles may be deposited onto a surface of the core light guide layer or a surface of a cladding layer.

Uses of the Light Guide Device

The light guide device according to the present invention may be employed for a range of functions including illumination, backlighting, signage and display purposes.

Liquid crystal devices are well known in the art. A liquid crystal display device operating in a transmissive mode typically comprises a liquid crystal cell, which may also be referred to as a liquid crystal panel, a backlight unit incorporating a light guide device, and one or more polarisers. Liquid crystal cells are also well known devices. In general, liquid crystal cells typically comprise two transparent substrates between which is disposed a layer of liquid crystal material. A liquid crystal display cell may comprise two transparent plates which may be coated on their internal faces respectively with transparent conducting electrodes. An alignment layer may be introduced onto the internal faces of the cell in order that the molecules making up the liquid crystalline material line up in a preferred direction. The transparent plates are separated by a spacer to a suitable distance, for example about 2 microns. The liquid crystal material is introduced between the transparent plates by filling the space in between them by flow filling. Polarisers may be arranged in front of and behind the cell. The backlight unit may be positioned behind the liquid crystal cell using conventional means. In operation, a liquid crystal cell, operating in a transmissive mode, modulates the light from a light source such as a backlight unit which may comprise a light guide device.

BRIEF DESCRIPTION OF THE DRAWINGS

Embodiments of the invention will now be described, by way of example only and without limitation, with reference to the accompanying drawings, and Examples in which:

FIG. 1 illustrates a known edge-lit light guide arrangement. LEDs (1) are arranged at the edge of a transparent polymer core light guide layer (2). Light (3) from the LEDs propagates by total internal reflection through the light guide layer and is scattered through approximately 90° by scattering structures, such as point like defects, (4) and exits (3a) the light guide layer. In the figure shown, the device is viewed from above as indicated; the main light output surface is indicated at (5) and the point like defects (4) are located on the opposite lower surface. Typically, the core layer is unclad, relying on the refractive index contrast between the core and surrounding air to provide the guiding effect. Light scattered out of this type of structure is emitted from the top surface over a full hemisphere of output angles.

In FIG. 2a, a comb shaped structure or lead frame (6) in plan view is shown. This structure may be produced either as a chemically etched discrete panel or as a continuous fine blanking process. The structure (6) comprises a number of thin substantially parallel legs (7) which are connected at each end (e.g. 7a, 7b) to a perimeter frame (8). The perimeter frame may provide structural rigidity and mechanical location points. The gaps (9) between the legs (7) are typically no wider than the thickness of the structure and may be about 0.2 mm wide. The structure (6) may be plated with suitable materials to facilitate wire-bonding, such as gold, which will not corrode or grow whiskers when an electrical current is applied to it. The structure is shown in side elevation indicated generally by (10).

FIG. 2b shows the structure from 2a with an array of LEDs (11) which have been fixed to the legs (7) of the lead frame (8). The LEDs may be fixed using conductive resin bonding or solder. The LEDs are shown as being fixed in a linear array. If the LEDs have a bottom electrode then the leg the LED is mounted on provides the power or the ground connection. If the LEDs have two top electrodes, the mounting legs provide only structural and thermal requirements and the legs either side of the LED are required to feed and return the power to the LED. The LEDs are wire-bonded to the appropriate legs in order to create electrical connections. The wire-bonds are indicated at (12) in FIG. 2b. The LEDs (11) may be white LEDs or individually red, green and blue LEDs in a number of different colour configurations. For example, there may be a repeating pattern of red, green and blue or there may be groups of each of the three colours and the group form a repeating colour pattern. The structure is shown in side elevation indicated generally by (13).

FIG. 2c shows the structure from 2b after it has been placed in an injection-moulding tool. The over-moulded polymer encapsulant is indicated at (25). In the embodiments shown in FIG. 2c the polymer is in the form of a compound parabolic concentrator (CPC) which is more clearly shown in the end view indicated generally at (14). The CPC structure is moulded over the array of LEDs. Typically, the injection moulded material is an optical grade polymer such as PMMA or PC. The side view of the structure illustrated in FIG. 2c is indicated generally by (15).

In FIG. 2d, the structure from FIG. 2c is illustrated after the perimeter frame has been removed, for example with a cutting or shearing tool. The legs (7) are now free at both ends but held in position relative to each other by the over moulded polymer encapsulant (25) in the form of a CPC. End and side views are indicated generally by (16) and (17) respectively. The free ends of the legs are indicated at (18).

In FIG. 2e, completed over-moulded structures (19a and 19b) are shown in contact with the edge of a light guide layer or light guide panel (20) which is suitable for use in a backlight. This coupling may be achieved by using an optical adhesive or an optical coupling medium. As indicated in FIG. 2e, multiple modules (indicated by 19a and 19b), or assemblies, may be attached along a single edge of the light guide panel. FIG. 2f illustrates an end view of the structure shown in FIG. 2e.

In FIG. 3, individual legs (7) are indicated in plan and side views wherein the leg has been etched or shaped to form a recess (21a and 21b) in the vicinity of the LED die to form a reflector. The LED die for use in these embodiments will typically emit light to the side and in the direction of the walls of the recess so that some light is reflected away from the recess and away from the leg. FIG. 3 shows two embodiments in plan and end elevation wherein the shaped recess may be bowl shaped (21a) or trench shaped (21b). The LED die and wire bonds are indicated at (11a, 11b) and (12a, 12b) respectively. The LEDs are fixed to the legs using a conductive resin or solder (22a, 22b). In a further alternative embodiment (not shown), the legs may be bent to form a recess.

FIG. 4a illustrates an alternative arrangement of the legs. The legs are etched such that the positive and negative connections for each (individually addressed) LED emerge from different sides of the over-moulded polymer encapsulant (25). The alternating legs are indicated at (7c, 7d). The legs may then be bent to form simple mechanical and electrical connectors of which a small number of example configurations are shown in FIGS. 4b, 4c and 4d (as indicated at (7e), (7f) and (7g) respectively). The legs may be formed such that they may form electrical connections to a wide range of readily available, commercial or custom made connector products (indicated generally by (100a, 100b, 100c). These connector products generally comprise a main structural element, for example part of a supporting frame and may comprise conducting pads (110a, 110b, 110c, 110d) for electrical connection to the legs. These connector products may also comprise rigid or flexible PCBs (120c, 120d). The terms flexible PCB, flexi-PCB or FPC are well known in the industry and refer to a pattern of conductors created on a bendable film that acts as an insulating (dielectric) base material. An FPC is a pliable counterpart to a rigid printed circuit board. The main structural element of the connector products may also comprise means for dissipating heat such as a heat sink (not shown). The legs may be formed to provide a spring clip action as in FIG. 4c or they may be formed so that they will provide a sliding connection to other standard electrical assemblies such as rigid or flexible PCBs as indicated in FIG. 4d.

FIG. 5 illustrates an embodiment where the legs are formed (7h, 7i) and pass through holes (26) in a rigid printed circuit board (PCB) (27). The PCB is shown in end elevation generally indicated by (29). The electrical connections can be formed to tracks on the PCB via flow-soldering methods. Solder is indicated at (28).

In FIG. 6a, lead frame legs (7) are bonded directly to a rigid or flexible PCB (30) using an anisotropic conductive film or tape (such as the 3M™ range of films, e.g. products 5363 and 9703). The legs can also be formed to produce a spring-clip mechanism for easy attachment to other structures in the display assembly. The spring clip arrangement is illustrated in FIG. 6b where the structure (100d) to which the lead frame legs are attached provides a method of ensuring a good thermal contact. For example, the structure that contacts the legs could have a high thermal conductivity.

In FIG. 7 the lead frame legs (7) are clamped in contact with a so-called "zebra" connector strip (31) and a flexi-PCB (30b). The zebra strip is a laminate of conductive layers and electrically insulating layers and is used to form robust, removable, electrical connections between the lead frame and the flexi-PCB. Clamping forces may be applied as illustrated in the direction of the arrows.

In FIGS. 8a and 8b, alternative LED types are used with only top electrodes. This may allow a simpler electrode leg structure to be formed which is mechanically stiffer and more robust to external loading (e.g. forces present due to injection over-moulding). Wider, fewer contacts can also be formed if top-electrode LEDs (11a) are electrically connected into 'daisy-chained' groups (i.e. LEDs in a group are electrically driven in series) as shown in FIGS. 8a and 8b. The wire bonds are indicated by (12a). FIG. 8b also illustrates that more than one LED may be present on a particular leg (7k). A number of holes or slots (75, 75a) are shown in FIG. 8b. These holes or slots may facilitate suitable flow or cross flow of the polymer when the non-imaging concentrator is formed.

FIG. 9a, illustrates an LED assembly in accordance with the present invention and generally indicated at (40) in the process of being optically coupled to a light guide layer (20) which may optionally be sandwiched between cladding layers (60a, 60b) as shown in FIG. 9b. The LED assembly (40) comprises a number of modules (or assemblies) indicated at (19a), (19b) and (19c). Each module comprises a number of thin substantially parallel legs (7) from which a perimeter frame has been removed. An array of LEDs (not shown) has been fixed to the legs of the lead frame and is over-moulded by a polymer encapsulant (25). The polymer encapsulant is in the form of a compound parabolic concentrator (CPC) which is indicated at (25). The CPC structure is moulded over the array of LEDs. The optional presence of a lens structure (51) is shown on the cladding layer (60a) which is in contact with the output surface of the light guide layer (20). The light guide layer (20) and LED assembly (40) comprising a number of modules (19a), (19b) and (19c) may be joined using an optical adhesive (52) which may be applied using a dispensing tip (53). In the particular embodiment shown and as indicated in the end view in FIG. 9b the edges of the light guide layer (20) may not overlap the CPC (25).

FIG. 10 illustrates an arrangement in accordance with a particular embodiment of the present invention and FIG. 11 is essentially a side view of such an arrangement. In FIGS. 10 and 11, the light guide device has been modified by the inclusion of cladding layers and microlenses. LEDs (11), in a linear arrangement, are encapsulated in a CPC (25) and arranged at the edge of a transparent polymer core light guide layer (20). Light from the LEDs propagates by total internal reflection through the light guide layer and is scattered through approximately 90° by scattering structures, such as point like defects, (4). Upper and lower cladding layers are indicated as layers (60a) and (60b) respectively and microlenses (51) are shown located on the upper cladding layer (60a). Optionally, a reflector layer (69) may be positioned behind or attached to the second cladding layer (60b). The microlenses (51) may be formed in a material with a higher refractive index than the cladding layers (60a and 60b) and from the same high refractive material as the core light guide layer (20). The range of light angles which is collected is greatly extended as the light is refracted from the thin layer of low index material (60a) into the high index layer of the microlenses (51). In FIG. 11, a light scatterer is indicated at (4a). A light ray propagating in the arc indicated at (62) is guided, i.e. retained in the light guide at least until it strikes a further scattering structure. If the light ray (or photon) is scattered substantially vertically, or at least within the range of angles indicated at (63), it will exit the guide and emerge from the microlens (51) within the useful range for the display application. The range of angles which may be lost is indicated by the arc (65). Light rays or photons which are scattered into the angles represented by (65) may exit the system in an uncontrolled manner. Although some of them may go to usefully illuminate the display many will not. By adopting the arrangement described, the range of angles indicated by (65) is minimised when compared to known devices. Hence, the optical efficiency of this system is high compared to known devices. Scattering structures are also shown at (4) and (4b) in FIG. 11. For ease of reference, the non-imaging concentrator is omitted from FIG. 11.

EXAMPLES

Example 1

Figure 1:
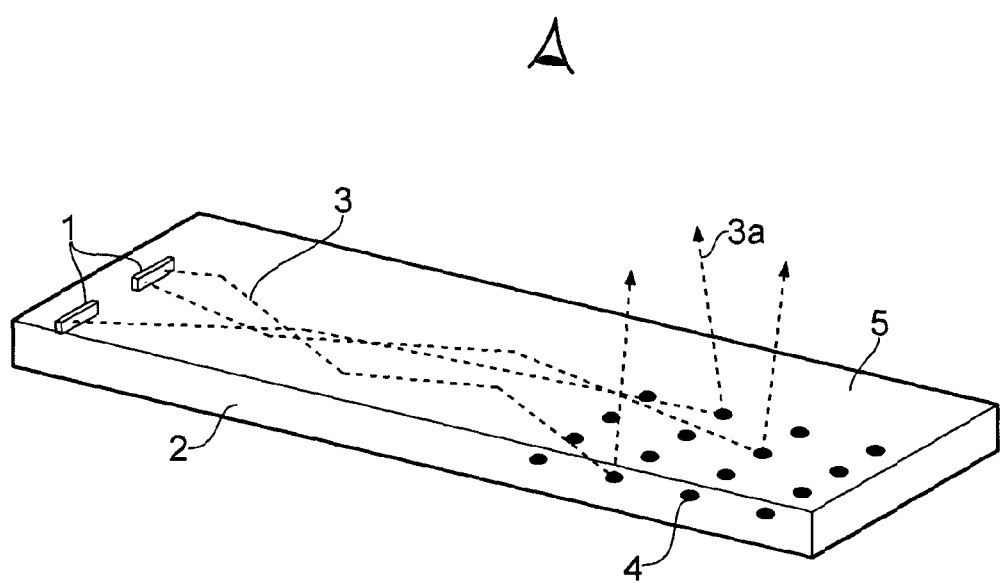
FIG. 1 illustrates a known edge lit light guide device.
Figure 2A:
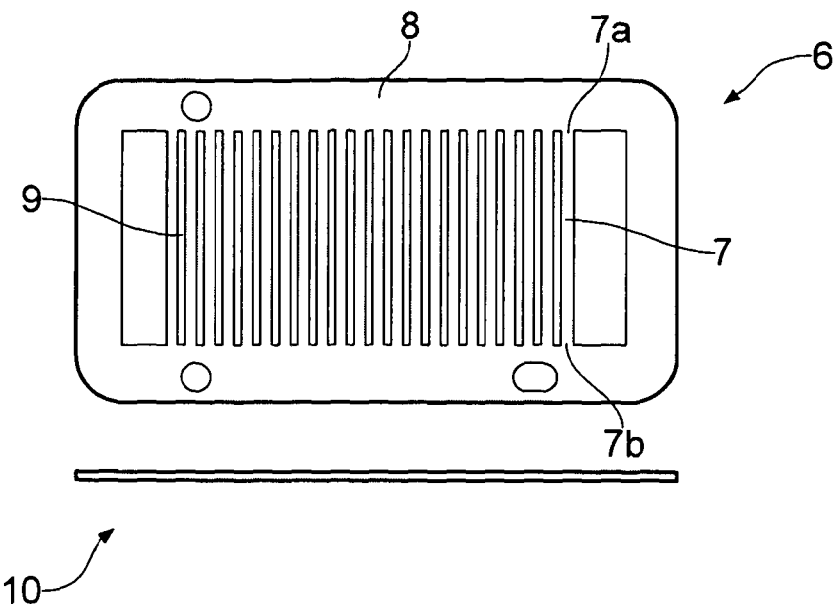
FIGS. 2a to 2f illustrate a process in accordance with the present invention for making the LED array and light guide device.
Figure 2B:
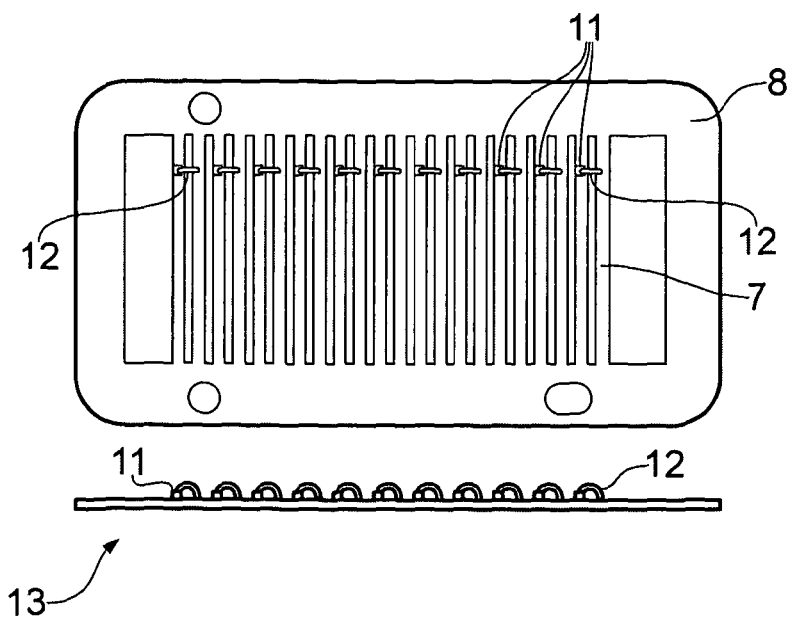
Figure 2C:
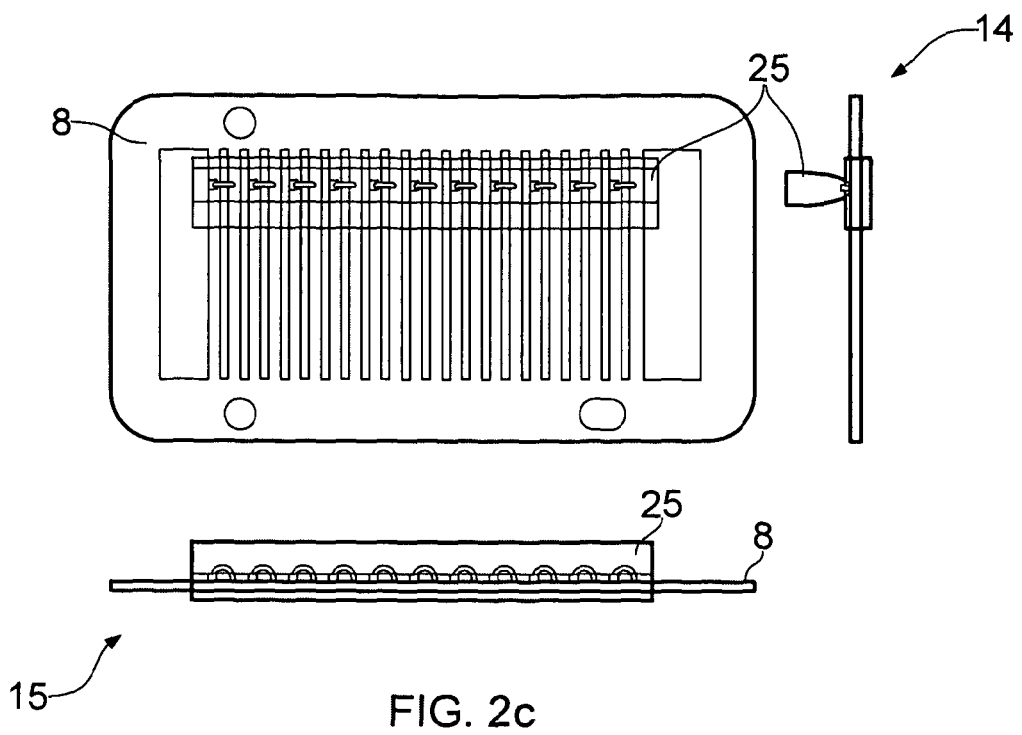
Figure 2D:
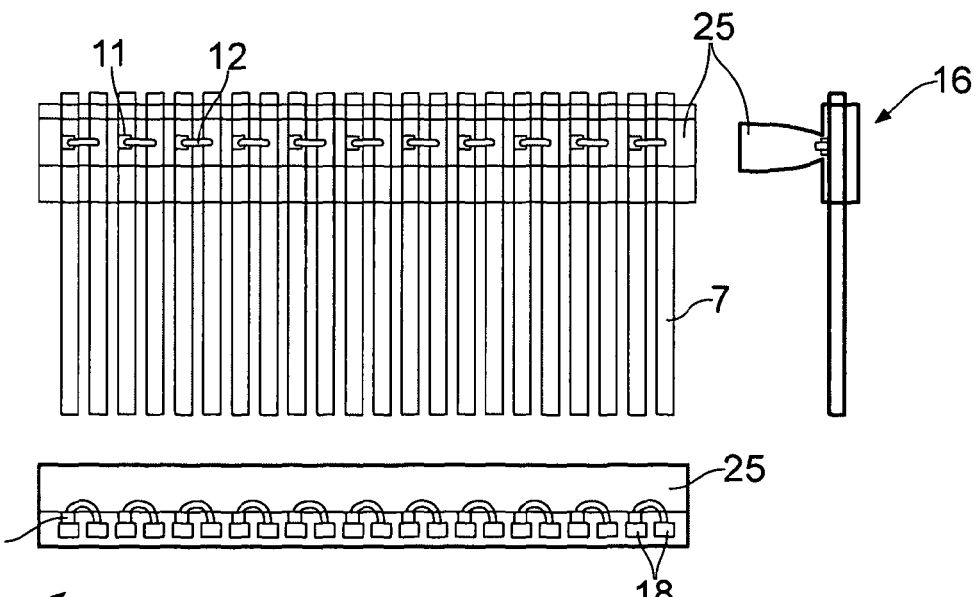
Figure 2E:
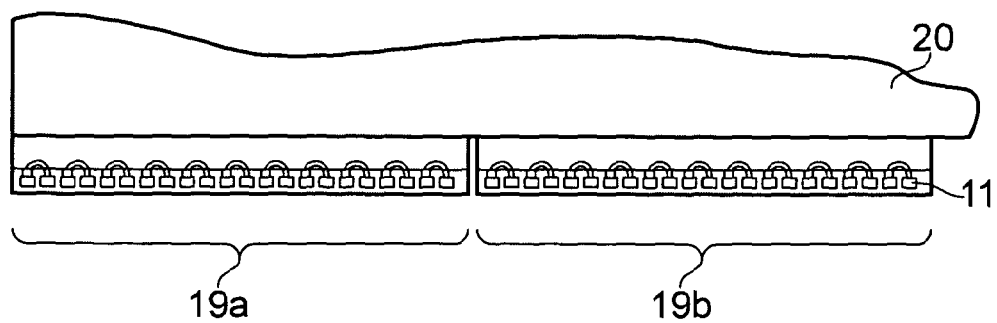
Figure 2F:
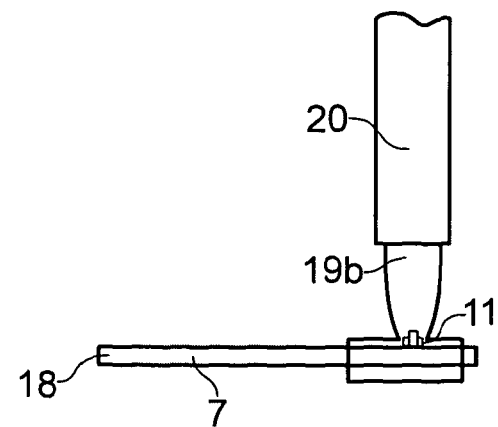
Figure 3:
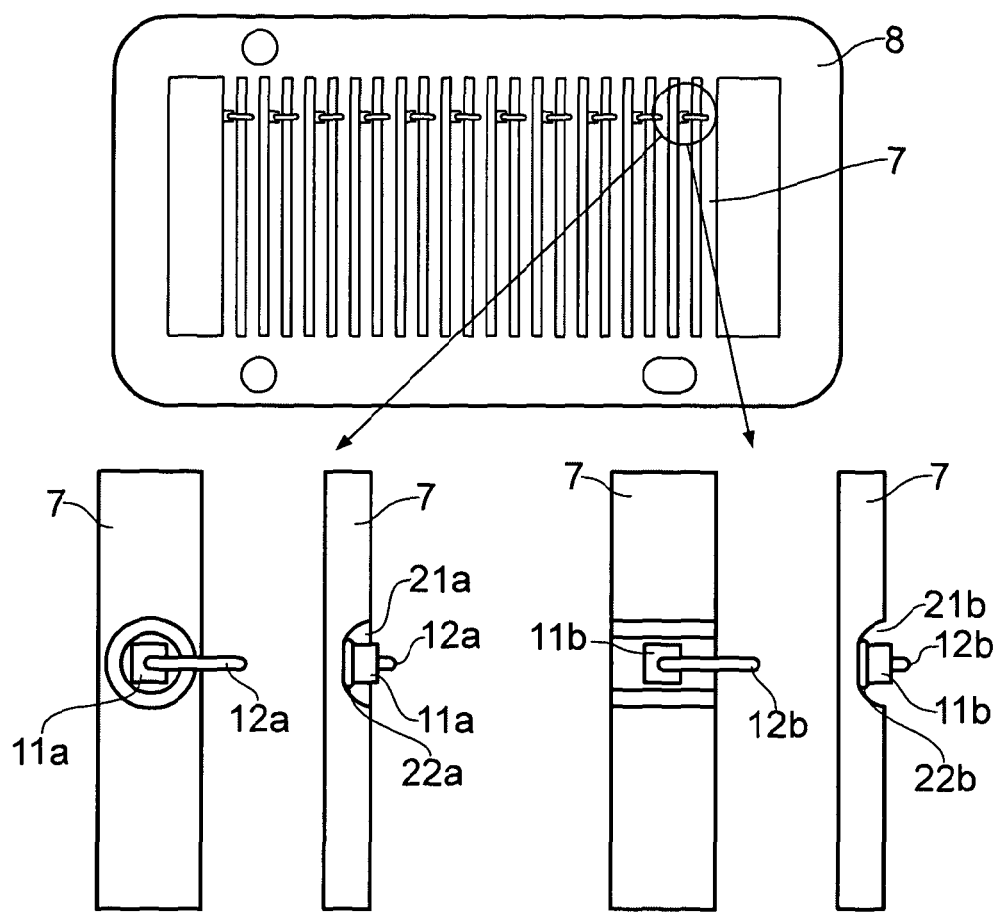
FIG. 3 illustrates embodiments wherein the LEDs are attached to recesses in the electrical connections.
Figure 4A:
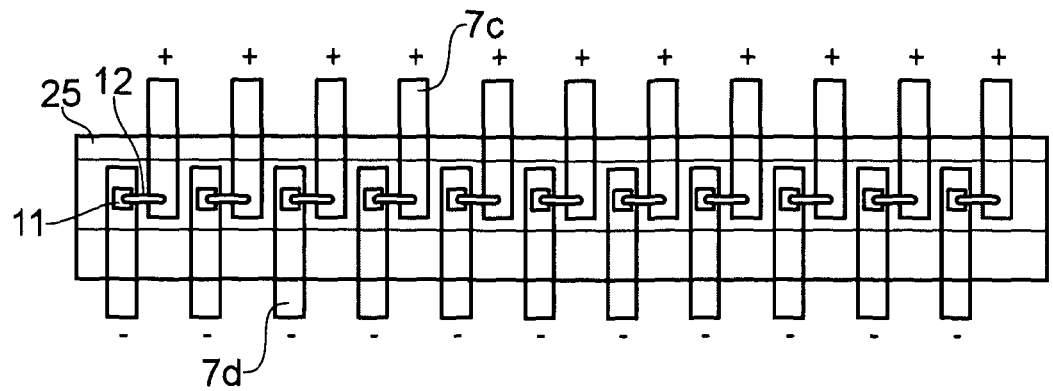
FIG. 4a illustrates an alternative arrangement of the lead frame legs where the legs which provide positive and negative power connections are located on both sides of the overmoulded polymer encapsulant.
Figure 4B:
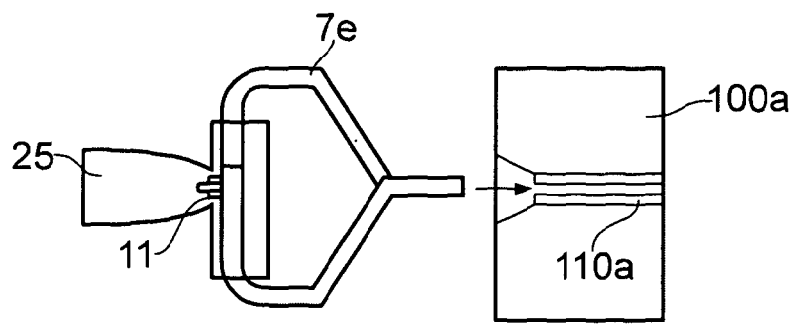
FIGS. 4b to 4d illustrate possible methods for forming of the lead frame legs from FIG. 4a to enable a simple mechanical and electrical connection to an external power source.
Figure 4C:
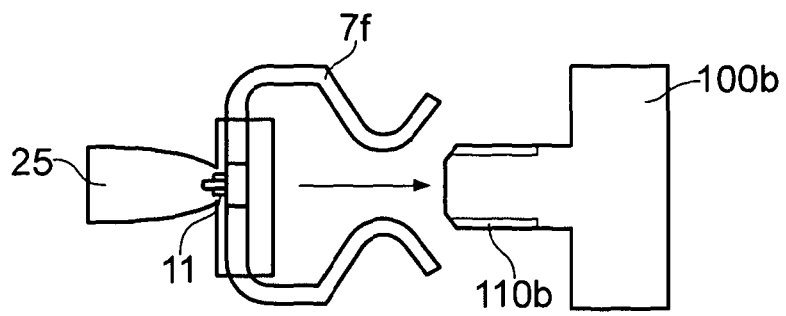
Figure 4D:
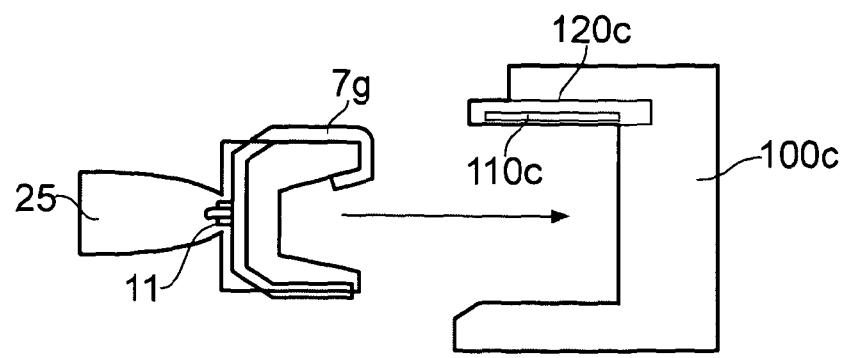
Figure 5:
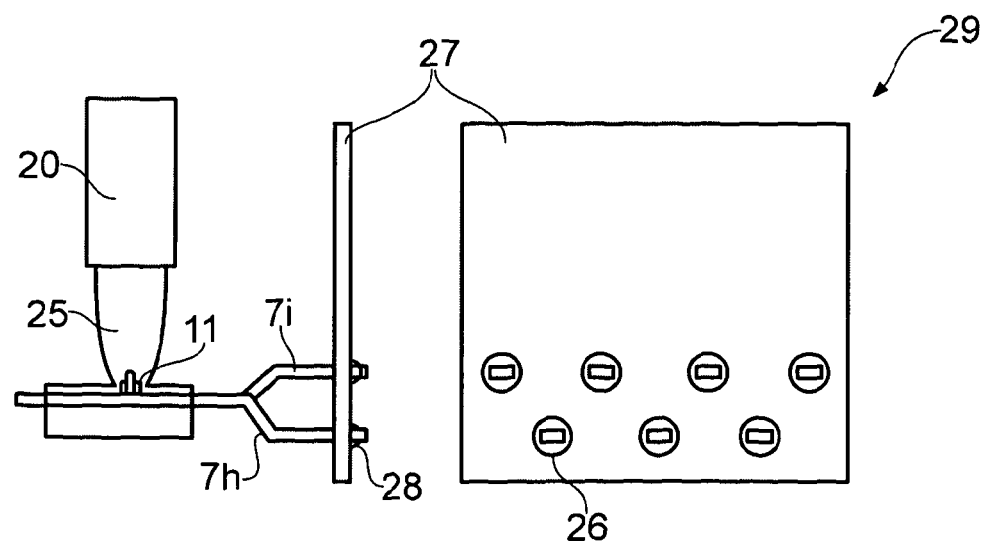
FIG. 5 illustrates an arrangement where the lead frame legs are connected directly to a rigid PCB. In this embodiment all of the lead frame legs are positioned to only one side of the over-moulded polymer encapsulant.
Figure 6A:
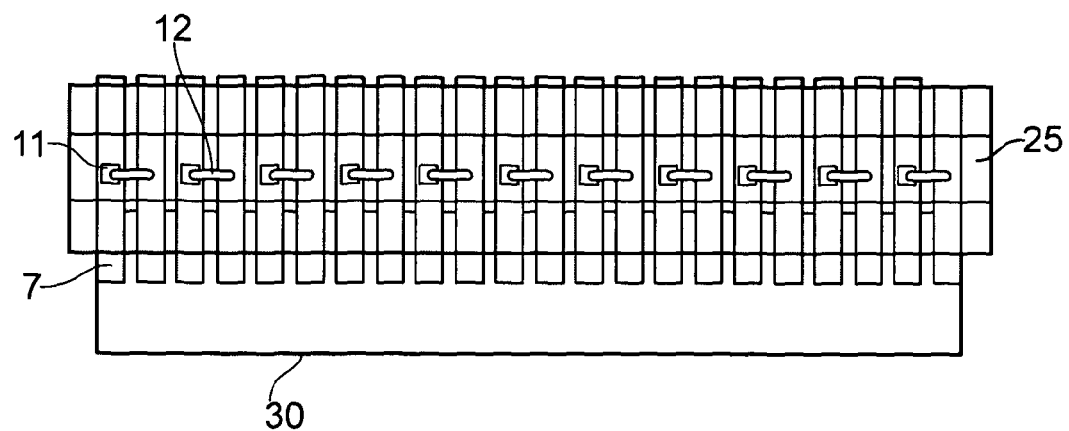
FIGS. 6a and 6b illustrate possible methods of achieving an electrical connection between the lead frame legs and a flexible or rigid PCB.
Figure 6B:
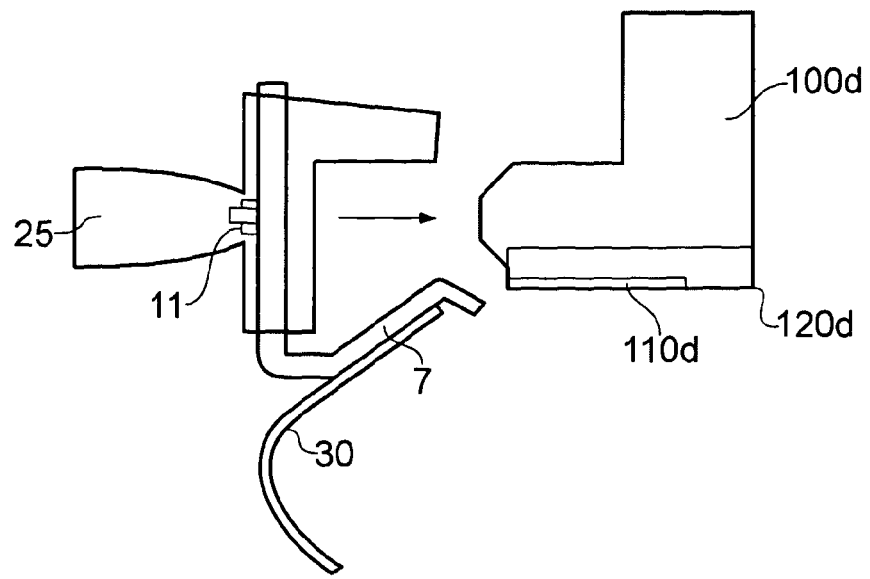
Figure 7:
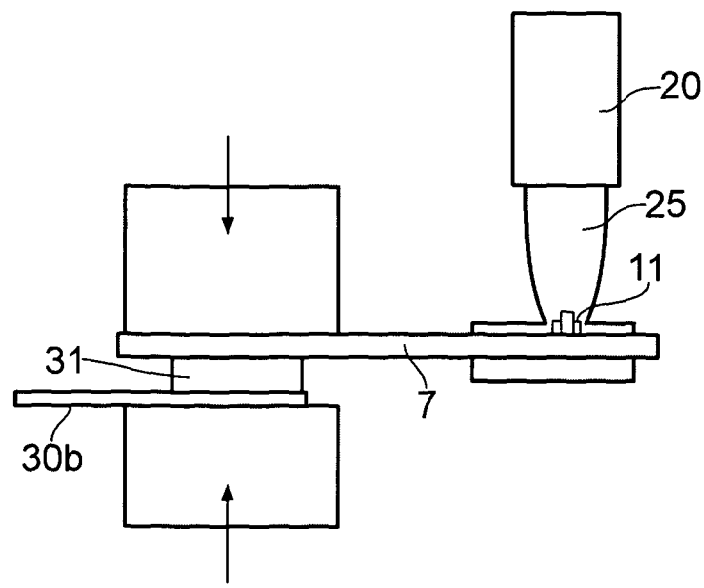
FIG. 7 illustrates an arrangement where a zebra strip is used to establish a reliable electrical connection between the lead frame legs and a rigid or flexi-PCB.
Figure 8A:
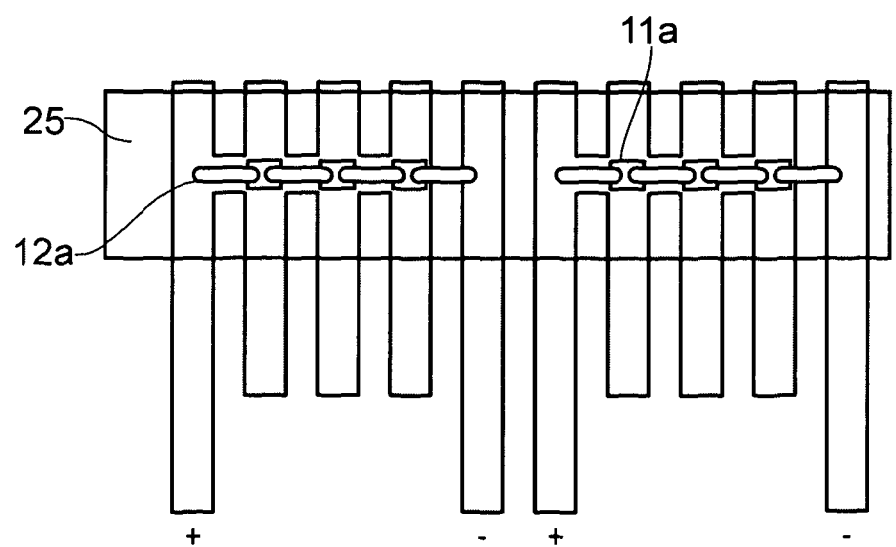
FIGS. 8a and 8b illustrate alternative arrangements of the lead frame which are possible if top-electrode LEDs are used.
Figure 8B:
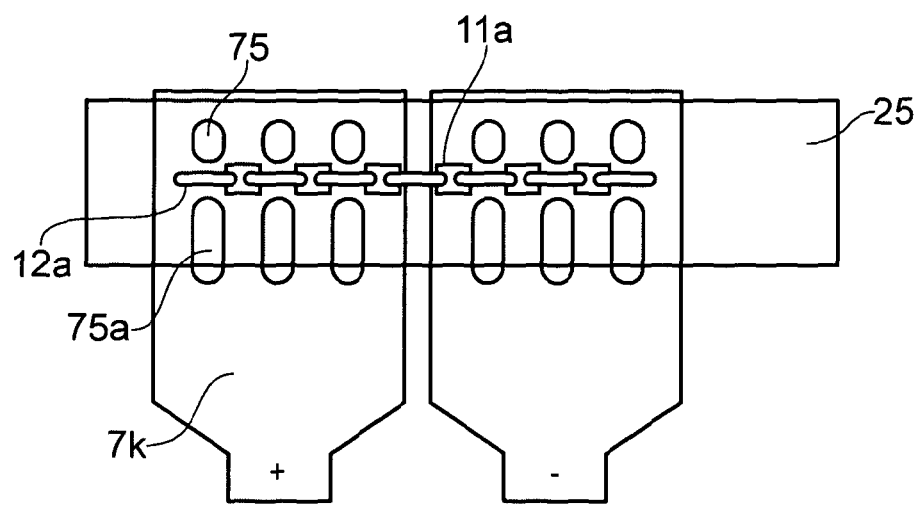
Figure 9A:
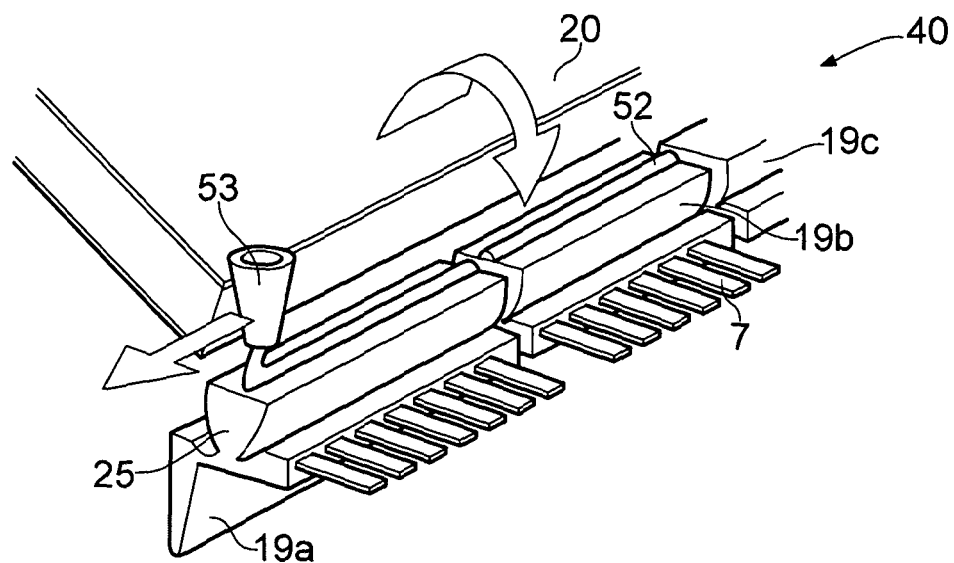
FIGS. 9a and 9b illustrate the construction of an LED assembly and light guide device from multiple modules.
Figure 9B:
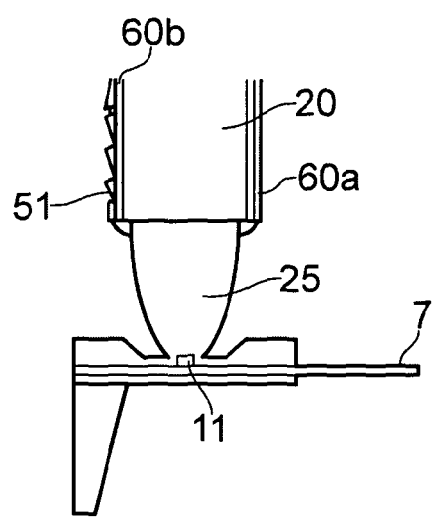
Figure 10:
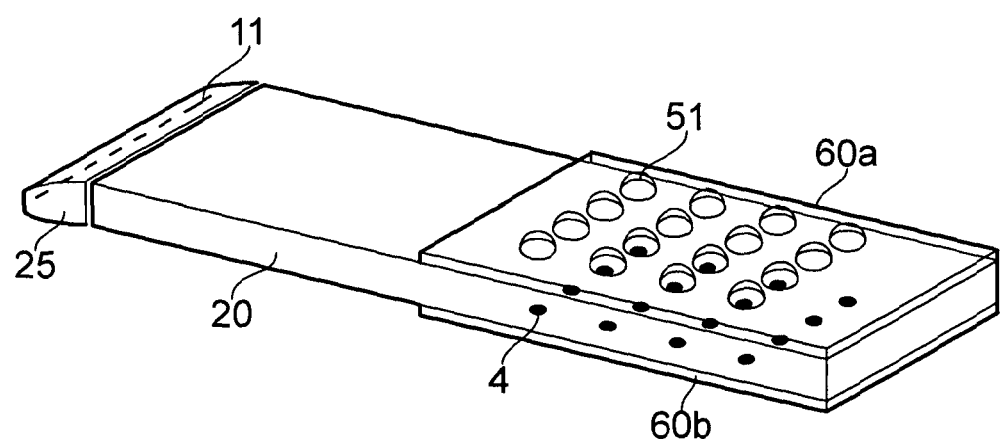
FIGS. 10 and 11 illustrate an arrangement in accordance with a particular embodiment of the present invention incorporating the use of cladding layers and microlenses.
Figure 11:
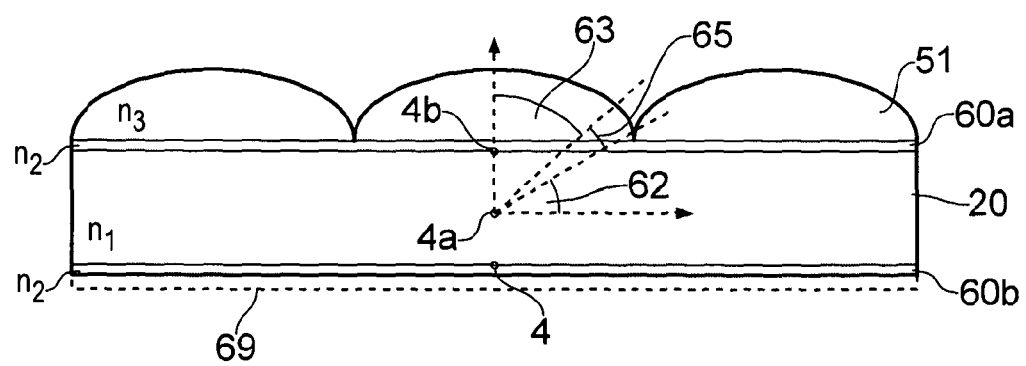

A lead frame was chemically etched from 0.2 mm to 0.25 mm thick, half-hard copper (C101, commercially available from Olin). A suitable alternative is copper beryllium sheet. Sixty lead frames were etched from a single sheet using industry standard chemical processes. The sheets were then electroplated with an industry-standard thickness of gold plate in order to allow a robust wire-bond to be made to the surface of the lead frame during a later manufacturing process. More specifically, the lead frame was plated with 3 to 5 µm of Sulphamate Nickel followed by 2 to 2.5 µm of pure gold. A suitable alternative plating material is silver (typically 5 to 7 µm).

Individual lead frames were then manually removed or "broken out" from the sheets in order to form individual lead frames. Each lead frame was used in the manufacture of a single LED module.

The chemical etching process produced a number of thin legs in each lead frame (58 legs in total). The lead frame legs were held together in the lead frame using a border which also contained features (holes and slots) that were used to accurately align the lead frame during subsequent assembly processes (e.g. scribing, die-attach, wire-bonding, injection-moulding).

Lead-frame legs can typically range in width from 0.4 mm to 1.2 mm depending on the LED mounting and wire-bonding requirements. Legs which have LEDs bonded to them may be typically much wider (0.8 to 1.2 mm) whereas simple electrical return legs are thinner at about 0.4 mm to 0.6 mm. The spacing between the legs is typically 0.2 mm. This represents the minimum possible gap using a chemical etching process or a fine-blanking process (which also limits the minimum feature gap to the thickness of the sheet material). In this particular example the lead frame legs which carried both a wire-bond termination and an LED were 0.75 mm wide and the electrical return legs were 0.4 mm wide. The gap width between all legs was 0.2 mm. There were two legs of 0.6 mm width, close to the injection-moulding gate which carried an LED but no wire-bond termination (these LEDs were individually addressable and not arranged in a chain).

The lead frame legs were designed to mount bare-die LEDs which have both upper and lower electrodes (rather than two upper electrodes). The lower electrodes formed an electrical bond to the lead frame legs via a metal-loaded bonding resin. The upper electrodes were electrically connected to an adjoining leg (either a return leg or one mounted with the next LED in a chain) via a wire-bond. The legs were arranged in specific patterns in order to form groups of red, blue and green LEDs in a pattern such as RGBRGBRGBRGB—where each letter represents a group of 3 or 4 red (R), blue (B) or green (G) LEDs. The objective was to create a pattern of sequentially coloured LED groups which produced the required light intensity and colour from the final LED module. In this particular example, on a single lead frame, there were 4 sets of sequential LED groups in the order RRRBBBBGGGG totalling 44 LEDs. At one end of the lead frame there were extra, smaller groups of green LEDs, two groups of two green LEDs and a single extra green LED at the extreme end. These smaller groups were placed at the end of the lead frame closest to the location of the injection-moulding gate. The aim was to minimise the effect of wire-bonds being damaged by the injection-moulding process. These smaller groups of LEDs were therefore designed to be sacrificial. If one or more of these smaller groups were damaged then the bulk light output of the final LED module would be largely unaffected.

A pair of manually scribed, parallel lines were then made on the upper surface of the lead frame in order to mark the required locations for the bare-die LEDs. The LEDs must be located within the two scribed lines. Reference features etched within the border of the lead frame were used to ensure an accurate (typically +/−20 μm) location of these scribed lines. The location of the LEDs is critical since the width of the CPC at the level of the LEDs is typically 0.5 mm which is only 0.15-0.2 mm greater than the width of the LEDs (which are typically 0.3 mm to 0.35 mm both sides). In mass production the accurate alignment and location of the bare-die LEDs may be achieved using an automated pick-and-place system which would be capable of achieving a linear alignment tolerance of +/−10 μm.

The bare-die LEDs were then manually positioned and resin-bonded onto the lead frame legs and between the scribe lines. Where necessary, the LEDs were positioned on the legs such that there was room for a wire to be bonded next to the LED. The volume of resin was controlled by a time-pressure dispensing system to deposit the minimum volume of resin. The objective was to minimise the amount of excess resin whilst ensuring a minimum resin thickness and a maximum contact area between the die and the lead frame legs. The resin used was an industry standard electrically and thermally conductive resin. A solder rather than a resin may be used. The LEDs used were obtained from Cree: Cree Blue LEDs (part number C470EZ290-0085), Cree Green LEDs (part number C527EZ290-0113) and from the company III-V Compounds, Red LEDs (part number TCO-B14UOR-R).

Gold wires were then wire-bonded between the top electrodes of the LEDs and the neighbouring lead frame leg. The gauge of the wire-bonds was chosen to be in the range of 25 μm to 33 μm in diameter. The larger gauge of wire was preferred as the thicker wires typically suffer less distortion during the injection-moulding process. 33 μm gold wire was used with wedge bonds on the LED and to the legs of the lead frames.

Following wire-bonding and a visual inspection using a microscope, the lead frames were vapour deposition coated in 12 μm of a high temperature grade polymer which was capable of surviving the injection-moulding process (Parylene N). This produced a conformal coating which was also capable of preventing the electrical shorting of the LEDs.

The lead frame was then placed into a single-cavity injection-moulding tool and the CPC lens was over-moulded directly over the lead frame, LEDs and wire-bonds. The injection gate was positioned so that the moulding material (a low melt flow index optical grade PMMA, Altuglas VM100) would flow along the main axis of the CPC lens. The injection gate was a wedge-shaped design which was located in the plane of the lead frame and this gate was angled to reduce the impact of the initial mould flow on the lead frame legs and the wire-bonds. The tool used a hot runner injection system so that the only plastic remaining on the lead frame when it was removed from the tool was the CPC lens.

The over-moulded lead frame was then removed from the mould tool and allowed to cool to form a near complete LED module. The border of the lead frame which previously held the legs together was then removed using a ground and sharpened hand tool, which sheared through the ends of the legs. The LED module was then placed in a rig to electrically test that the LEDs had been over-moulded with no damage to the wire-bonds. This test simulated the electrical drive which would be used in the final display product (producing a maximum 50 mA of current in each chain of LEDs) and allowed the LED module to be lit up so that failures of groups of LEDs could be easily observed. The test duration was limited to a few seconds in order to prevent the build-up of heat within the LED module (the final product removes the heat generated by the LEDs via a heat-sink).

The light guide layer (typically 885 mm×520 mm×1.5 mm thick) was then positioned and clamped into an assembly jig so that the 1.5 mm thick edge for bonding the LED modules was facing upwards. The first LED module was then clamped into an adjustable section of the same assembly rig and the module was positioned (using micro-positioners) so that the 1.4 mm wide output face of the CPC lens was aligned to, and fully in contact with, the corresponding edge of the light guide layer. The thickness of the CPC at its output face was 1.4 mm compared to the thickness of the light guide layer at 1.5 mm to ensure that all of the light output from the LED module would pass into the light guide layer. The first LED module was aligned to the far edge of the light guide layer.

The LED module was then lifted upwards from the light guide layer and a number of drops (typically 10 drops, pitch ~5 mm) of optical UV-cure resin (Dymax OP44) were dispensed onto the edge of the light guide layer. The LED module was lowered back into contact with the light guide layer at a controlled speed so that the resin had time to spread between the two parts and remove any air voids. When the CPC module had been lowered so that it was fully in contact with the light guide layer, the resin was cured via exposure to a concentrated UV light source. The curing process typically took a few seconds. The volume and pitch of the resin spots which were applied to the edge of the light guide layer were optimised in order to ensure that the joint between the components was filled with no air voids and that the amount of excess resin (which was squeezed out of the joint) was minimised.

This assembly process was repeated with the next module which was located next to the first LED module with a minimum gap between the two modules of 0.5 mm. A total of 18 modules could be assembled to an 885 mm wide light guide layer in this manner.

Discussion

There are numerous advantages and beneficial features associated with the present invention. The over-moulded structure, including the CPC optical structure, is compatible with mounting onto a thin (for example about 1 mm-4 mm) edge of a polymer light guide structure without deforming as the temperature changes. It is a low cost way of combining large numbers of LEDs in a rigid transparent material. Low cost may be achieved by using pre-existing, high-volume manufacturing methods e.g. fine-blanking or chemical etching of the lead frames and injection over-moulding. The LEDs and wire-bonds are protected from physical damage as they are encapsulated within a rigid polymer. The wire-bonds are protected from electrical shorting through the use of a high temperature conformal coating such as Parylene D. In addition, the LEDs and wire bonds are not damaged by the differential thermal expansion between the encapsulating polymer and mechanical or electrical connections to the component. Further, the injection-moulding process ensures that there will be no air inclusions surrounding the LEDs, which, if present, would reduce the optical coupling efficiency to the non-imaging concentrator (e.g. CPC). The use of an injection-moulding process allows the use of a wider range of polymers compared to traditional casting and resin-transfer moulding processes. Encapsulating polymers can be selected which can match the thermal expansion and optical requirements of the system, e.g. by matching or substantially matching the refractive indices of the non-imaging concentrator and the light guide layer.

Flexibility concerning the nature of the electrical connections is provided. For example, the electrical connections can be made to the legs of the lead frame via soldering to a rigid PCB or by physical contact with a flexi-PCB. The ease of establishing electrical connections to the drive system is improved.

The lead frame format is easily modified to change the distribution of the LED array or to adapt to different sizes and types of LED. LED pitch is easily changed by changing the leg pitch and larger LEDs are accommodated by increasing the width of the legs. Further, changes in LED height may be accommodated by using a chemical milling process to change the height of the mounting position on the lead frame legs. A high-refractive-index material such as an epoxy resin or a UV curing acrylate resin may be pre-encapsulated onto the LEDs prior to injection-moulding using micro-dispensing methods thus increasing the optical coupling efficiency between the LED and the injection-moulded CPC.

The invention claimed is:

1. An edge-lit light guide device comprising:
   an LED assembly wherein the LED assembly comprises an array of LEDs wherein the LEDs are mounted on electrical connecting structures and said LEDs are encapsulated in a transparent polymer wherein the transparent polymer forms a single non-imaging concentrator and said non-imaging concentrator is optically coupled to a core light guide layer,
   wherein the core light guide layer is sandwiched between inner surfaces of a first cladding layer and a second cladding layer,
   wherein a plurality of scattering structures is located at one or more of the following: at an interface between the first cladding layer and the core light guide layer, at an interface between the second cladding layer and the core light guide layer, and within the core light guide layer,
   wherein a series of microlenses is arranged on an outer surface of the first cladding layer, wherein the outer surface is opposite the inner surface of the first cladding layer, and
   wherein refractive indices of the microlenses and the core light guide layer are greater than refractive indices of the cladding layers.

2. An edge-lit light guide device according to claim 1, wherein the electrical connecting structures comprise a number of substantially parallel legs.

3. An edge-lit light guide device according to claim 2, wherein the parallel legs are made from metal.

4. An edge-lit light guide device according to claim 1, wherein the core light guide layer is a transparent polymer.

5. An edge-lit light guide device according to claim 1, wherein:
   the plurality of scattering structures is located at one or more of the following: at the interface between the first cladding layer and the core light guide layer, and at the interface between the second cladding layer and the core light guide layer;
   the microlenses are located directly above the plurality of scattering structures; and
   the refractive indices of the microlenses and the core light guide layer are substantially the same.

6. An edge-lit light guide device according to claim 5, wherein the refractive indices of the microlenses and the core light guide layer are from about 1.4 to about 1.8 and the refractive indices of the first and second cladding layers are from about 1.25 to about 1.4.

7. An edge-lit light guide device according to claim 1, wherein the non-imaging concentrator is a compound parabolic concentrator.

8. An edge-lit light guide device according to claim 1, wherein the non-imaging concentrator is made from an optical grade polymer.

9. An edge-lit light guide device according to claim 8, wherein the non-imaging concentrator is made from a pure or blended PMMA or PC.

10. An edge-lit light guide device according to claim 1, wherein the non-imaging concentrator is an injection moulded non-imaging concentrator.

11. An edge-lit light guide device according to claim 1, wherein refractive indices of the non-imaging concentrator and the light guide layer are the same or substantially the same.

12. An edge-lit light guide device according to claim 1, wherein refractive indices of the non-imaging concentrator and the light guide layer are about 1.4 to about 1.8.

13. An edge-lit light guide device according to claim 1, wherein thermal expansion of the non-imaging concentrator and the light guide layer are the same or substantially the same.

14. A method of making an LED assembly comprising an array of LEDs which is suitable for use in a light guide device comprising:
   mounting an array of LEDs on to a lead frame, wherein the lead frame comprises a number of substantially parallel legs which are connected at each end to a perimeter frame;
   injection moulding a transparent polymer to encapsulate the mounted LEDs within said transparent polymer; and
   removing the perimeter frame.

15. A method according to claim 14, wherein the injection moulded transparent polymer is in the form of a single non-imaging concentrator.

16. A method according to claim 15, wherein the non-imaging concentrator is a compound parabolic concentrator.

17. A method according to claim 14, comprising connecting the substantially parallel legs to a flexible printed circuit board or a rigid printed circuit board.

18. A method according to claim 14 further comprising mounting the LED assembly to an edge of a light guide layer.

19. A display device comprising a light guide device comprising:
- an LED assembly wherein the LED assembly comprises an array of LEDs wherein the LEDs are mounted on electrical connecting structures and said LEDs are encapsulated in a transparent polymer wherein the transparent polymer forms a single non-imaging concentrator and said non-imaging concentrator is optically coupled to a core light guide layer,
- wherein the core light guide layer is sandwiched between inner surfaces of a first cladding layer and a second cladding layer,
- wherein a plurality of scattering structures is located at one or more of the following: at an interface between the first cladding layer and the core light guide layer, at an interface between the second cladding layer and the core light guide layer, and within the core light guide layer,
- wherein a series of microlenses is arranged on an outer surface of the first cladding layer, wherein the outer surface is opposite the inner surface of the first cladding layer, and
- wherein refractive indices of the microlenses and the core light guide layer are greater than refractive indices of the cladding layers.

20. An edge-lit light guide device according to claim 1, wherein the light guide device is disposed in a display device which is a liquid crystal device.

\* \* \* \* \*